April 10, 1951  J. W. DICKEY  2,548,708
ELECTRICALLY-HEATED STEAM GENERATOR AND POWER UNIT
Filed Aug. 2, 1945  4 Sheets-Sheet 1

INVENTOR.
John W. Dickey
BY
Clinton S. James
ATTORNEY

WITNESS
Esther B. Stockton

April 10, 1951  J. W. DICKEY  2,548,708
ELECTRICALLY-HEATED STEAM GENERATOR AND POWER UNIT
Filed Aug. 2, 1945  4 Sheets-Sheet 2

WITNESS
Esther M. Stockton

INVENTOR.
John W. Dickey
BY Clinton S. Janes
ATTORNEY

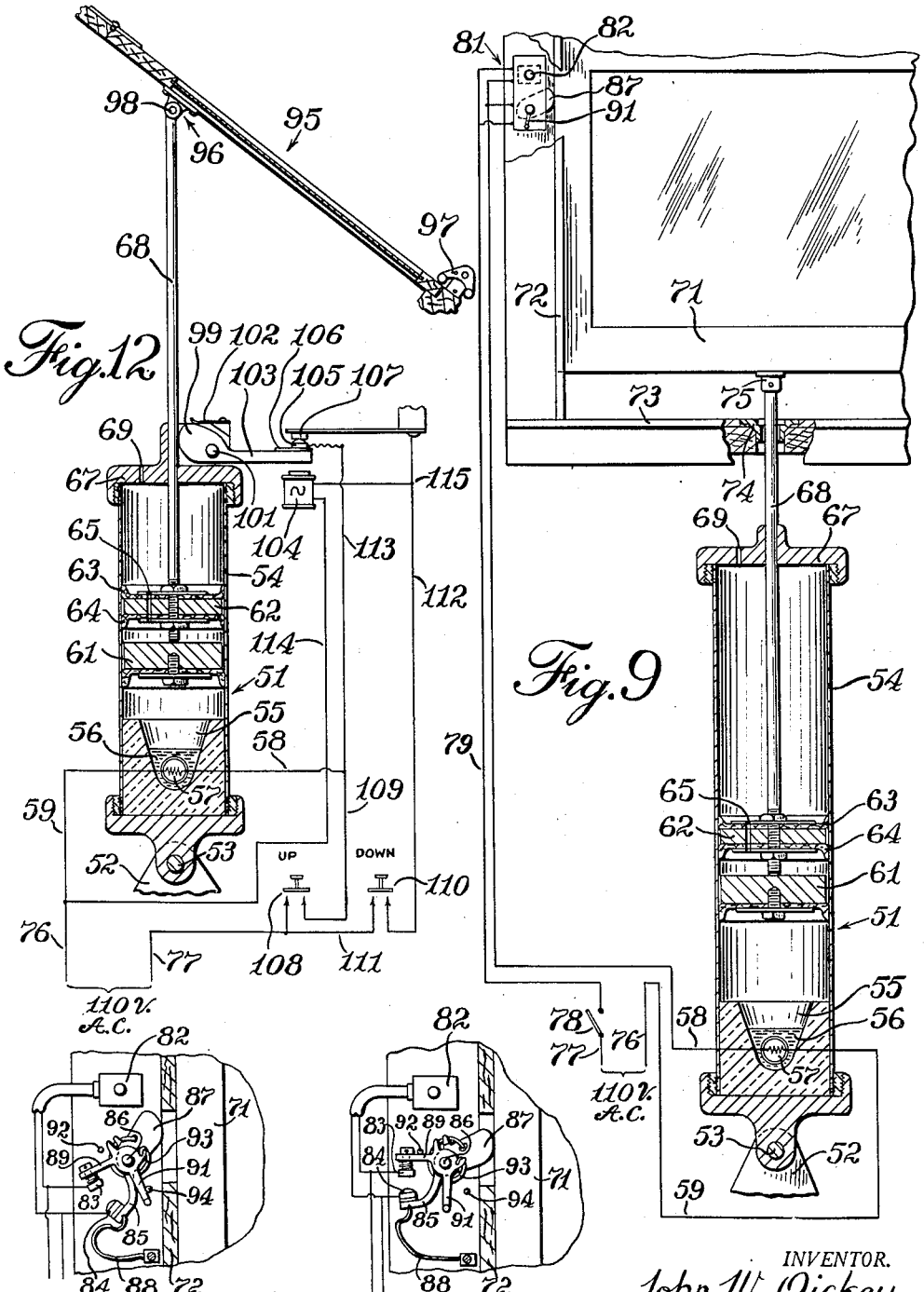

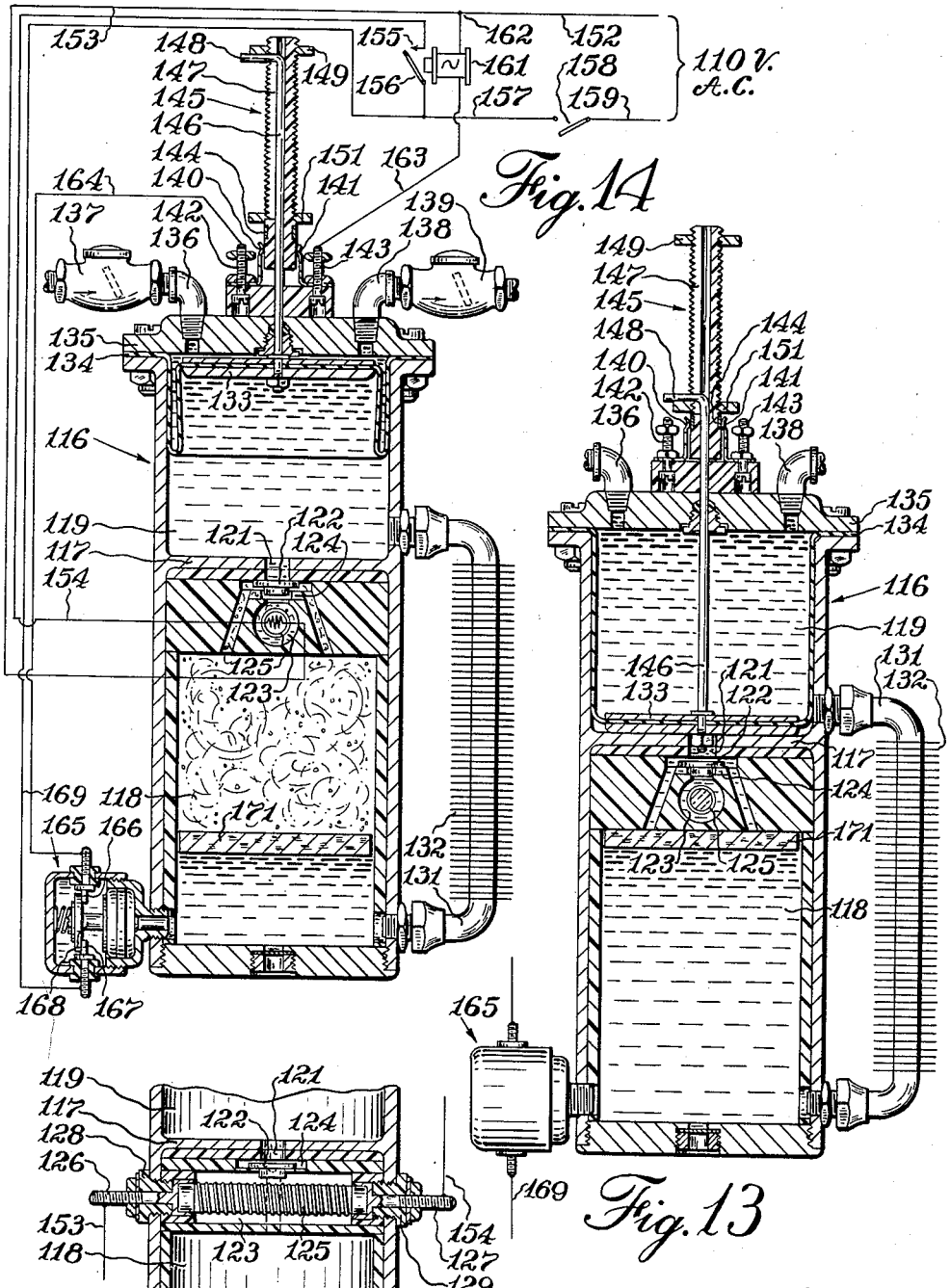

Patented Apr. 10, 1951

2,548,708

UNITED STATES PATENT OFFICE 2,548,708

ELECTRICALLY HEATED STEAM GENERATOR AND POWER UNIT

John W. Dickey, Elmira, N. Y., assignor to Bendix Aviation Corporation, South Bend, Ind., a corporation of Delaware Application August 2, 1945, Serial No. 608,539

11 Claims. (Cl. 60—25)

1

The present invention relates to a steam actuated motor and more particularly to a device for transforming electrical energy into mechanical force.

There are many types of movable devices requiring mechanical force for their operation which it would be desirable to operate by a power unit, but the cost, weight and/or bulk of an electrical motor, gearing, etc. is restrictive if not prohibitive. Thus it would be very desirable to operate windows, particularly in automobiles or where the windows are heavy or inaccessible; closures such as vault doors, garage doors or bomb bay doors, automobile jacks, etc. by power units having suitable characteristics and capable of remote control. However, considerations of economy, space and weight have been effective deterrents.

It is an object of the present invention to provide a power unit which is capable of exerting adequate force for the intended purpose while being of small, light, simple and economical construction.

It is another object to provide such a device which is adapted for remote or automatic control.

It is a further object to provide such a device which is noiseless and free from vibration.

It is another object to provide such a device which may easily be adapted for operation by any common form of electrical energy.

It is another object to provide such a device which is especially adaptable for all uses in which the power stroke of the device moves the load in one direction, the return stroke being accomplished with comparatively light resistance or by means of the reaction of the load.

Further objects and advantages will be apparent from the following description taken in connection with the accompanying drawings, in which.

2

Figure 4:
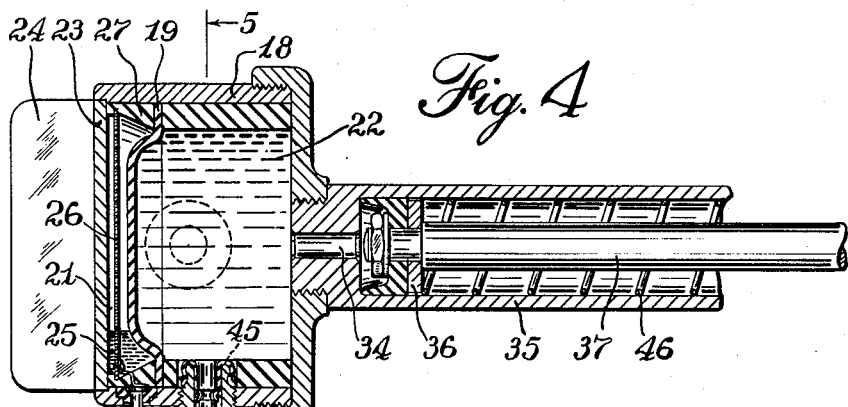
Fig. 4 is a sectional view of a steam actuated motor embodying hydraulic transmission mechanism.
Figure 7:
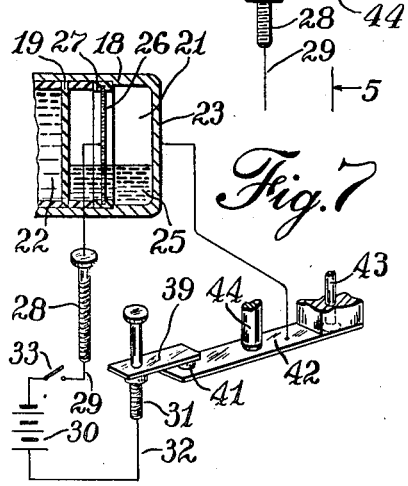
Figure 8:
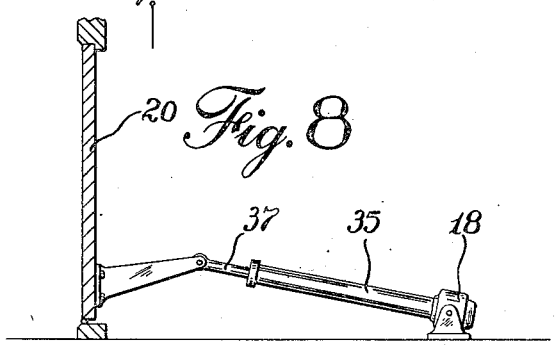

Fig. 7 is a semi-diagrammatic detail of the heating and controlling means for the actuated motor of Fig. 4;

Fig. 8 is a side elevation, on a reduced scale, of the actuator of Fig. 4 as used to operate a hinged door;

Fig. 9 is a semi-diagrammatic representation of a system for raising and lowering a slidable member such as a window, utilizing a steam actuated motor;

Fig. 10 is a detail on an enlarged scale of the controlling mechanism for the window illustrated in Fig. 9, the parts being shown in normal position;

Fig. 11 is a view similar to Fig. 10 showing the parts in the positions assumed during the lowering of the window;

Fig. 12 is a semi-diagrammatic showing of a remote controlling system for a swinging member such as a hinged skylight window;

Fig. 13 is a sectional view of a steam actuated motor system adapted for use as a pump, the parts being shown in their positions at the start of the power stroke;

Fig. 14 is a view similar to Fig. 13 showing the parts at the end of the power stroke; and Fig. 15 is a sectional detail showing the method of mounting the heater element for the boiler in the wall of the container.

Figure 1:
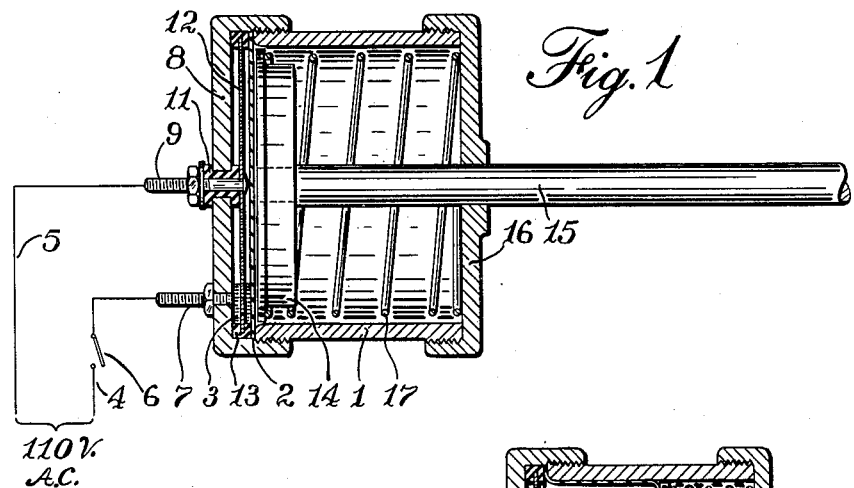
Fig. 1 is a sectional view of a simple form of steam actuated motor embodying the principles of the invention.

In Fig. 1 of the drawing, there is illustrated a cylindrical container 1 having fixed therein near one end an elastic septum or partition 2 dividing the container into a small chamber and a large chamber. A small amount of a suitable vaporizible liquid 3 is placed in the small chamber, and electrical heating means are provided for boiling the liquid so as to form steam. The liquid may be heated either by a wire resistance element immersed therein, or when a conductive liquid is used it may be heated by passing a current therethrough. This latter method has been found to operate best with alternating current since this avoids the generation of fixed gases. Various liquids have been found suitable for the purpose. For exmple, a solution of sodium carbonate in water has been found to be very satisfactory, particularly in view of its non-corrosive nature, and its resistance to freezing. As here shown, means are provided for conducting current through the liquid 3 to boil it. This means comprises an electrical circuit including any suitable source of alternating current, not illustrated, which is conveyed to the motor by means of conductors 4 and 5, one of said conductors including a manually operable switch 6. The conductor 4 is connected to a binding post 7 fixed to a cap 8 forming the end wall of the container 1. The conductor 5 is attached to a binding post 9 which traverses the cap 8 and is insulated therefrom as indicated at 11. The binding post 9 connects with a disc-shaped perforated electrode 12 (Fig. 3), the periphery of which is molded in a ring of insulating material 13 clamped between the edge of the septum 2 and the cap 8.

A piston 14 is arranged to slide loosely within the container 1 and is provided with a rod 15 which traverses a cylinder head 16 threaded on the body of the container, which rod is adapted to operate any suitable load. If the device is used to raise a weight or to overcome a yielding resistance, the piston will of course be returned to idle position automatically. In other cases a spring 17 may be employed to yieldingly hold the piston in contact with the septum 2.

Figure 2:
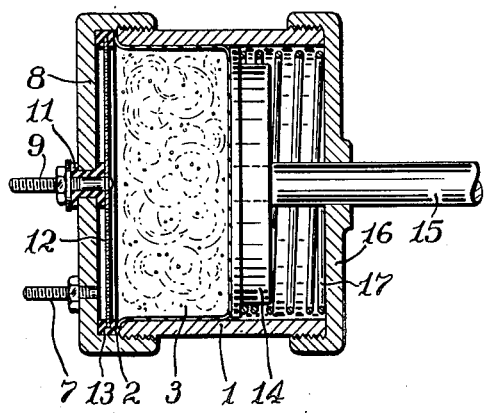
Fig. 2 is a similar view showing the actuated motor near the end of its power stroke.

In the operation of this embodiment of the invention, closure of the manual switch 6 completes the circuit through the binding post 9, the electrode 12, the liquid 3 and the cap 8 to the binding post 7. The resistance of the liquid is such that it rapidly becomes heated to its boiling point, thus quickly producing steam which stretches the septum 2 and moves the piston 14 as shown in Fig. 2. When the heating current is interrupted, the boiling of the liquid ceases and the steam rapidly condenses thus allowing the piston to return to its idle position.

It will be understood that whether the heating of the liquid is accomplished by using the liquid itself as the resistor, or by a suitable metallic resistor traversing the liquid, as above set forth, the small quantity of liquid involved causes the heating operation to take place quite rapidly so that the generation of steam is almost instantaneous.

Figure 3:
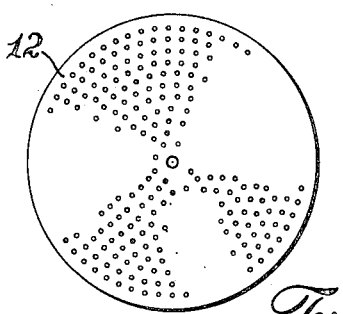
Fig. 3 is a detail in elevation of an electrode constituting an element of the electrical heating means.
Figure 5:
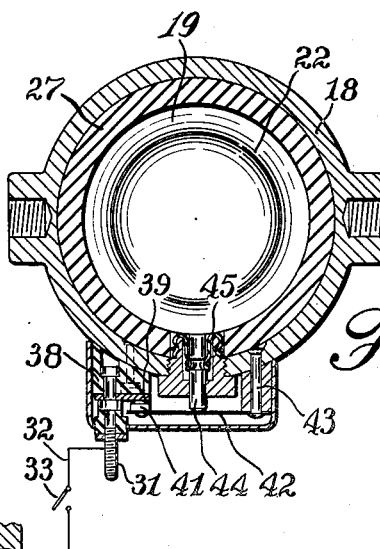
Fig. 5 is a section taken on the line 5—5 of Fig. 4.
Figure 6:
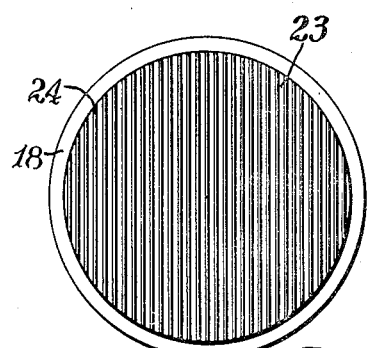
Fig. 6 is a detail of the end closure of the container showing the cooling fins.

In Figs. 4, 5 and 6 of the drawing, the basic unit disclosed in Figs. 1, 2 and 3 is employed to actuate a piston hydraulically whereby the device to be operated may be at any convenient distance from the motor and if desired a plurality of devices may be operated by one motor. As shown in Fig. 4, a container 18 of generally cylindrical shape has a septum or elastic partition 19 mounted near one end thereof so as to divide the interior of the container into a small chamber 21 and a large chamber 22. The small chamber is closed by an end plate 23 which may be provided with cooling fins 24 to accelerate the cycling of the device. A small amount of vaporizable liquid 25 is placed in the chamber 21, and a disc-shaped perforated electrode 26 is mounted in said chamber so as to be in contact with the liquid 25. The electrode is provided with an insulating mounting as indicated at 27, and is connected to an insulated binding post 28 which serves as an attachment for a feed line 29. A second binding post 31 is mounted in the wall of the chamber 21 and serves for attachment of a conductor 32 which completes the heating circuit through a manually operable switch 33.

The electrical circuit for the heater is best illustrated in Fig. 7 which shows a source of electrical energy such as a battery 30 connected through the switch 33 and lead 29 to the binding post 28. As above set forth, the electrical current traverses the liquid between the electrode 26 and the casing 23, returning to the battery through the flexible strip 42, contacts 41 and 39, and lead 32.

The liquid 25 is of the conducting type described whereby it serves as its own heating resistance, the passage of current therethrough causing almost instantaneous ebullition thereof.

The large chamber 22 is filled with a suitable incompressible liquid such as the liquid used for the hydraulic operation of automotive brakes. This chamber is connected by a conduit 34 to a cylinder 35 in which is mounted a slidable piston 36 arranged to be actuated by hydraulic pressure in the cylinder and to transmit the force thereof through a piston rod 37 to any desired load device. It will be understood that the conduit 34 may be in the form of a tube of any desired length and that a plurality of load devices may be simultaneously actuated by suitably manifolding the connecting means from the chamber 22 to the actuating cylinders.

Means are preferably provided for automatically limiting the pressure developed in the steam actuator. As best shown in Fig. 5, this is here accomplished by insulating the binding post 31 as indicated at 38, and providing a fixed contact plate 39 which is normally engaged by a movable contact 41 mounted on the end of a flexible strip 42 which is connected as shown at 43 to the wall of the chamber 21. A pin 44 is slidably mounted in an opening through the wall of chamber 22 in position to engage the contact strip 42. Suitable flexible packing 45 is provided for preventing the escape of the hydraulic fluid around the pin 44 while permitting its longitudinal movement responsive to the pressure within the chamber 22. The spring strip 42 is so designed that it holds the contacts 41, 39 in engagement until the pressure in chamber 22 reaches a predetermined value whereupon the pin is actuated by said pressure to disengage said contacts, thus opening the heating circuit for the liquid 25 and thereby preventing a further rise in pressure within the container 18.

In the operation of this embodiment of the invention, closure of the manual switch 33 causes rapid vaporization of the liquid 25 within the chamber 21 whereby the pressure therein moves the septum 19 so as to force the liquid out of chamber 22 into cylinder 35 whereby piston 36 actuates the rod 37 to perform its function. When the desired function has been accomplished, opening of switch 33 stops the vaporization of the liquid 25, whereupon it rapidly condenses, assisted by the heat radiation of the fins 24, whereupon the pressure within the container 18 subsides, and the parts return to idle position either by virtue of the load imposed upon the piston rod 37, or by means of a return spring 46 in the cylinder 35 bearing on the piston 36.

One use to which this form of the invention may be adapted is shown in Fig. 8, wherein the actuator 18 may be mounted on a stationary surface such as a wall and adapted to open and close a door 20 through a thrust connection including a pressure cylinder 35 and a thrust rod 37. It will be noted that in the linkage shown the angle between the axis of the thruster 35 and the door strut is flatly obtuse so that the thruster 35 will be under the highest pressure when the linkage is in the most unfavorable position for moving the door.

In Figs. 9, 10 and 11 of the drawing, applicant's steam actuated motor is illustrated as incorporated in a system for controlling a sliding member such as a window. As there shown, a steam actuated motor indicated generally by number 51 is mounted at one end on a fixed anchorage 52, the mounting connection being preferably hinged as indicated at 53 in order to provide for possible misalignment or angular mounting of the reciprocating parts. The motor comprises a cylinder 54 closed at its lower end and provided with a cup-shaped boiler chamber 55 containing a small amount of vaporizable liquid 56. An electrical heater 57 is immersed in said liquid and is arranged to be energized by current supplied through a pair of leads 58 and 59. The heater is preferably cylindrical in shape with its axis parallel to the axis of the hinge 53, and the boiler chamber 55 is conformed thereto and provided with flared sides so that the actuator may be tilted through a large angle while keeping the heater immersed in the liquid 56. A suitable cylindrical heater is illustrated in greater detail at 125 in Fig. 15 and it will be understood that the heater 57 may preferably be of the type illustrated in Fig. 15.

A piston 61 is slidably mounted in the cylinder 54 so as to be raised by steam pressure generated by the boiler. A second piston member 62 is also slidably mounted in the cylinder 54 above the piston 61 and normally resting thereon, the piston 62 being provided with oppositely facing packing cups 63 and 64, and with a small bleeder opening 65 whereby the pressures on both sides of the piston will be gradually equalized. The upper end of the cylinder 54 is provided with a head 67 forming a bearing guide for a thrust rod 68 attached to the piston 62. The head 67 is also provided with a small bleeder opening 69 forming communication between the upper end of the cylinder 54 and the outside atmosphere.

A window sash 71 is slidably mounted in a window casing 72, a sill 73 of which is arranged directly over the cylinder 54, and is perforated and provided with a bearing guide 74 for the thrust rod 68. The upper end of the rod 68 has a thrust block 75 fixed thereon which is adapted to engage the bottom of the window sash 71 and raise said sash when the piston 62 moves upward in the cylinder 54. Preferably bearing 74 is formed to provide a seat for the thrust block 75 so that said thrust block is normally flush with the surface of the window sill.

Means for energizing the heater 57 is provided comprising an electrical circuit for supplying current to the leads 58, 59. As here shown, a supply main 76 is connected to the lead 59 and the other supply main 77 is connected through a master switch 78 to a lead 79 which is connected to a manual control panel indicated generally by numeral 81. As best seen in Fig. 10, this control panel comprises a push button switch 82 and a pair of contacts 83, 84 in parallel therewith, either of said switching devices being adapted to connect the lead 79 to the lead 58 to complete the electrical circuit for the heater 57.

Contact 84 is mounted on an arm 85 pivoted on a pin 86 fixed in the window casing, and formed on its opposite end with a wedging lock member 87 adapted to engage the window sash 71 and prevent downward movement thereof. The locking member 87 is yieldingly pressed into engagement with the window sash by suitable means such as a spring 88.

The contact 83 is yieldingly mounted on an arm 89 which is also pivoted on the pin 86 and is provided with a crank handle 91 which projects out from the window casing for manual operation. Pin 92 defines the idle position of the crank 91, and a spring 93 yieldingly connects said crank with the lock member 87, the spring 93 being substantially stiffer than the spring 88 whereby manipulation of the crank in a counter-clockwise direction will first close contacts 83, 85 and thereafter apply force to the locking member 87 to disengage it from the window sash. The counter-clockwise movement of the crank 91 is limited by a stop pin 94.

In the operation of this embodiment of the invention, the master switch 78 being closed, if it be desired to raise the window sash 71, the push button 82 is operated to complete the circuit to the heater 57. The liquid 56 is thereby rapidly vaporized, causing a pressure in the cylinder 54 which raises the piston 61, and with it the piston 62 whereby the rod 68 is caused to move upward and raise the window sash by means of the thrust block 75. When the sash has been raised the desired amount, release of the push button 82 causes the heater 57 to be deenergized whereupon the steam in the cylinder 54 condenses and the two pistons with the rod 68 return to their idle positions, the sash being retained in its raised position by the wedging action of the lock member 87.

Should the window be stuck in its lower position so that considerable pressure has to be built up before it is forced to move, the actuator may have a tendency to throw the sash upward. This tendency is inhibited by the dashpot action of the air trapped in the upper part of the cylinder 54 which can only escape through the restricted opening 69.

When it is desired to lower the window sash, the crank 91 is manually rotated in a counter-clockwise direction up against the stop pin 94. This operation first closes contacts 83, 84 thus completing the heating circuit, and tensions the spring 93 so as to apply a force to the lock member 87 tending to release it. At this time, however, the weight of the sash 71 is supported by the wedging action of the lock so that the lock is held in engagement with the sash. In a short time, however, steam actuator 51 projects the thrust block 75 upward into engagement with the bottom of the sash 71, thus taking the weight of the sash from the lock member 87. This permits the lock to move into disengaging position as shown in Fig. 11 under the action of the spring 93, which opens the contacts 83, 84 thereby deenergizing the heating circuit. The consequent subsidence of the steam pressure in the actuator 51 permits the sash to be lowered until the operator releases the handle 91 whereupon the spring 88 causes the lock 87 to reengage the side of the window sash 71 and prevent further downward movement thereof.

The bleeder opening 65 in the piston 62 is provided to control the downward movement of the piston 62 and permit it to come to rest in contact with the piston 61, when the parts are in idle position.

In Fig. 12 of the drawing, there is illustrated an embodiment of the invention substantially similar to Fig. 9 but in this case the control of the window lifter is arranged to be effectuated at any position remote therefrom. The motor itself is the same as illustrated in Fig. 9, and the parts thereof are similarly numbered. In this case, however, the window sash 95 is illustrated as of the hinged type pivoted to a casing at 96 and having a suitable holding detent member 97.

The thrust rod 68 is pivoted to the sash 95 as shown at 98, and locking means are provided for cooperation with said rod rather than with the sash itself. As here shown, this locking means comprises a wedging member 99 pivoted at 101 to the cylinder head 67, and yieldingly pressed into wedging engagement with the rod 68 by means of a spring 102. The lock member 99 is provided with an outwardly extending arm 103 which is of magnetic material and is arranged to be attracted by an electro-magnet 104 which is sufficiently powerful to overcome the spring 102 and hold the lock member 99 in retracted position.

A contact 105 is mounted on the end of the arm 103, insulated therefrom as indicated at 106, and is adapted to engage a cooperating contact 107 when the lock member 99 is in operative position.

The electrical circuit for the heater 57 comprises in this case the supply main 76 which is connected by lead 59 to one side of the heater, and the supply main 77 which is connected through a push button switch 108 and lead 109 to the heater lead 58 to complete the heating circuit. The push button 108 is accordingly the "up" button.

A "down" push button switch 110 is connected by a lead 111 to the supply main 77, and by a lead 112 to the contact 107. Contact 106 is connected by a lead 113 to the heater lead 58 so that the "down" button switch 110 and contacts 106, 107 are arranged in a circuit which is shunted around the "up" button switch 108.

One side of the electro-magnet 104 is connected by a lead 114 to the supply main 76, and the other side of the electro-magnet is connected at 115 to the lead 112.

In the operation of this embodiment of the invention, starting with the parts in idle position as illustrated, if it is desired to open the window sash 95, the operator closes the "up" button switch 108 which completes the electrical circuit through the heater 57 thereby boiling the liquid 56 and causing the piston 61 to move the piston 62 and rod 68 so as to raise the sash. When the sash has been opened the desired amount, release of the push button 108 allows the steam pressure to subside whereupon the piston 61 returns to idle position, but piston 62 and rod 68 are held in adjusted position by the lock member 99.

When it is desired to lower the window, closure of the "down" push button switch 110 causes energization of the heater 57 through contacts 106, 107, and at the same time energizes the electro-magnet 104. The latter, however, is unable to release the lock 99 due to the wedging action of the weight of the window sash. When the pressure in the motor 51 has been built up sufficiently, the piston 61 lifts the weight of the sash from the lock member 99, thus permitting the electro-magnet 104 to retract said member, at the same time opening contacts 106, 107. The heating circuit is thereby broken, whereupon the pressure within the motor diminishes, permitting the window to be lowered. The lowering of the window will continue until the down button 110 is released by the operator, thus deenergizing the electro-magnet 104. The lock 99 thereupon reengages the rod 68 under the action of the spring 102, and immobilizes the window.

In Figs. 13, 14 and 15, applicant's steam actuated motor is illustrated in a form adapted to produce continuous reciprocatory movement to perform the functions of a pump. As there shown, the motor comprises a cylinder 116 which is divided by a partition 117 into a lower chamber 118 and an upper chamber 119. The partition 117 has a central opening 121 therethrough which is arranged to be closed by a check valve member 122. A boiler in the form of a cup-shaped member 123 is arranged beneath the check valve 122. The opening of the cup is surrounded by a flange 124 so arranged that liquid flowing down from the upper chamber will fill the boiler cup.

An electrical heater 125, best shown in Fig. 15, is mounted in the cup 123 for the purpose of boiling the liquid therein. This heater comprises a cylindrical coil of resistance wire, the ends of which are mounted in binding post members 126 and 127 which are held in bushings 128, 129 threaded through the walls of the actuator. The bushings 128, 129 are slightly larger in exterior diameter than the outside diameter of the heater 125 whereby removal of the bushings permits the heater to be withdrawn axially from the motor for convenient service or replacement.

The lower portions of chambers 118, 119 are connected by a by-pass conduit 131 which conduit may be provided with cooling fins 132 to accelerate the cycling of the device. A piston 133 is slidably mounted in the upper chamber 119 and is provided with any suitable form of packing. As here illustrated, the packing function is performed by a flexible septum 134 which is attached to the piston and is clamped beneath the cylinder head 135 which forms the closure for the upper chamber 119. An inlet fitting 136 with a check valve 137 and an outlet fitting 138 with a check valve 139 are mounted in the cylinder head 135 whereby reciprocation of the piston 133 causes liquid to be alternately admitted through the inlet 136 and ejected through the outlet 138.

Means for automatically controlling the heater 125 are provided in the form of an electrical circuit comprising a pair of spring contacts 140, 141 connected to binding posts 142, 143 mounted on the top of the cylinder head 135, said contacts being adapted to cooperate with a bridging contact 144 mounted on a cylinder of insulating material 145. The cylinder 145 is slidably mounted on a rod 146 which extends upwardly from the piston 133, and is slotted axially as shown at 147 to permit the upper end 148 of said rod to project radially therefrom. Adjustable stop members 149 and 151 are threaded on the ends of the member 145 in position to be engaged by the out-turned end 148 of rod 146 as the piston 133 approaches the end of its stroke. The member 145 is thus caused to move axially a short distance to alternately connect and disconnect the contacts 140, 141 through the contact 144. The electrical circuit which energizes the heater 125 comprises a supply main 152, lead 153 connected to binding post 126 of the heater, lead 154 connected to heater binding post 127, normally open relay contacts 155, 156, lead 157, manual switch 158 and supply main 159.

Means for controlling the relay contacts 155, 156 is provided in the form of an electro-magnet 161 connected at 162 to the supply main 152, and by a lead 163 to the control switch binding post 143. Binding post 142 is connected by a lead 164 to a high-pressure circuit breaker 165. This circuit breaker comprises contacts 166, 167 which are normally closed but which are opened by a plunger 168 responsive to excessive pressure within the chamber 118. The relay circuit is completed by a lead 169 which connects the circuit breaker 165 to the supply lead 157.

In the operation of this embodiment of the invention, at the start of the power stroke as illustrated in Fig. 13, the check valve 122 is open, the heater 125 is deenergized, the lower chamber 118 is substantially filled with liquid, and the piston 133 is at the bottom of its stroke, the chamber 119 above the piston being filled with liquid to be pumped. Closure of the switch 158 causes energization of the relay 161 since contacts 140, 141, 144 are closed. Closure of relay contacts 155, 156 causes energization of the heater 125, whereupon the liquid within the boiler cup 123 quickly assumes a state of violent ebullition. The evolved steam pushes the check valve 122 up against the opening 121 in the partition 117, and the consequent trapping of the steam in the upper part of the chamber 118 causes the liquid therein to be forced out through the by-pass 131 into the lower part of the upper chamber 119, causing the piston 133 to move upward and force the liquid above the piston out through the outlet 138. During this stroke, the friction encountered by the liquid flowing through the by-pass 131 provides sufficient differential in pressure between the lower and upper chambers to hold the check valve 122 firmly seated against the partition 117.

When the piston 133 approaches the end of its stroke, the end 148 of the rod 146 engages the stop member 149, thus raising the cylinder 145 and breaking the connection between contacts 140, 141. The relay 161 is thus deenergized, causing contacts 155, 156 to open and permit the heater 125 to cool off.

As soon as the pressure in the lower chamber becomes equalized with the pressure in the upper chamber, the check valve 122 falls, thus permitting the liquid in the upper chamber to flow down into the lower chamber condensing the steam therein and refilling the boiler cup 123. The consequent further reduction in pressure causes the piston 133 to be moved down to the lower end of its stroke, whereupon the end 148 of the rod 146 engages the lower stop 151 and moves the contact 144 into engagement with contacts 140, 141, whereupon a new pumping cycle is started. The pumping operation therefore continues so long as the manual switch 158 remains closed.

Condensation of the steam in the lower chamber at the surface of the liquid therein during the power stroke has not been found to be of serious consequence. If, however, it be desired to reduce such condensation, this may be accomplished by the use of a floating diaphragm in the lower chamber such as indicated at 171.

When the cooling fins 132 are used on the by-pass 131, the temperature of the liquid is kept down, whereby the condensing effect of the liquid during the inlet stroke of the pump is accelerated, thus increasing the rapidity of the pumping operation.

Although certain embodiments of the invention have been shown and described in detail, other embodiments are possible and various changes may be made in the design and arrangement of the parts without departing from the spirit of the invention as defined in the claims appended hereto.

What is claimed is:

1. Means for transforming electrical energy into mechanical force including a chamber containing a small amount of vaporizable liquid, electrical heating means for said liquid, a cylinder adjacent the chamber, a piston in said cylinder movable by the pressure generated by vaporization of the liquid by the heating current, means for controlling the heating current to thereby control actuation of the piston, a second piston in the cylinder adapted to be moved by the first piston, means including a rod connecting the second piston to a load, locking means preventing return movement of the load after actuation thereof, and means for releasing the lock, including further a closure for the cylinder having a restricted opening cooperating with said second piston to act as a dashpot to control the return movement of the load.

2. Means for transforming electrical energy into mechanical force including a chamber containing a small amount of vaporizable liquid, electrical heating means for said liquid, a cylinder adjacent the chamber, a piston in said cylinder movable by the pressure generated by vaporization of the liquid by the heating current, means for controlling the heating current to thereby control actuation of the piston, a second piston in the cylinder adapted to be moved by the first piston, means including a rod connecting the second piston to a load, locking means preventing return movement of the load after actuation thereof, and means for releasing the lock, including further means for closing the heating circuit and applying force to the lock to release it, and means responsive to release of the lock for opening the heating circuit.

3. In a device for actuating a movable member, a cylinder having a small quantity of vaporizable liquid therein, an electrical heating means for vaporizing said liquid, a piston in the cylinder adapted to be moved by the vapor pressure therein, means for transmitting the movement of the piston to said movable member, a lock preventing return movement of said member, an electrical circuit for said heating means including a manual switch, and a shunt circuit for said heating means including a pair of contacts so associated with said lock that release of the lock opens said contacts; including further, manually controlled means for applying force to the lock tending to release it, and at the same time closing the shunt circuit to energize the heating means.

4. In a device for actuating a movable member, a cylinder having a small quantity of vaporizable liquid therein, an electrical heating means for vaporizing said liquid, a piston in the cylinder adapted to be moved by the vapor pressure therein, means for transmitting the movement of the piston to said movable member, a lock preventing return movement of said member, an electrical circuit for said heating means including a manual switch, and a shunt circuit for said heating means including a pair of contacts so associated with said lock that release of the lock opens said contacts, in which said contacts are normally closed, and the shunt circuit includes a second manual switch; and electromagnetic means controlled by said second manual switch for applying a force tending to release the lock and open said contacts.

5. A steam actuated pump including a container having an upper chamber and a lower chamber separated by a fixed partition having an opening therethrough, a check valve preventing flow of liquid up through the opening, an electrically heated boiler in the upper part of the lower chamber, a conduit connecting the lower parts of said chambers, a movable piston in the upper chamber, a conduit having an inlet check valve admitting liquid to be pumped into the upper chamber, and a discharge conduit having an outlet check valve, both conduits being connected to the upper part of the upper chamber, a vaporizable liquid in the lower chamber and boiler, and an electrical circuit for vaporizing liquid in the boiler whereby closure of the first mentioned check valve causes the vapor pressure produced by the boiler to force the vaporizable liquid through the first mentioned conduit into the upper chamber beneath said piston so as to force the piston upwardly.

6. A steam actuated pump as set forth in claim 5 in which said electrical heating circuit includes contacts, and means for opening said contacts when the movable piston approaches the end of its upward stroke, and for closing said contacts when it approaches the end of its downward stroke.

7. A steam actuated pump as set forth in claim 5 in which said boiler is in the form of a cup located beneath the opening in the fixed partition so as to be filled by liquid pouring through the opening.

8. A steam actuated pump as set forth in claim 5 in which said conduit is constricted so that when liquid is passing therethrough from the lower chamber to the upper chamber, there will be a differential in pressure between said chambers sufficient to hold said check valve closed.

9. A steam actuated pump as set forth in claim 5 in which said boiler comprises a cylindrical heater element traversing the chamber, and mounting and packing means therefor in the opposite sides of the container which are at least as large in diameter as said heater element so that removal of the mounting means permits withdrawal and replacement of the element through the side wall of the container.

10. In a steam actuated motor for moving a member to be adjusted, a cylinder, a piston slidably mounted therein, an electrically heated boiler in the cylinder, a small quantity of vaporizable liquid in the cylinder in contact with said boiler arranged when vaporized to move the piston away from the boiler; means cooperating with said piston to form a dashpot controlling the movement of the piston, locking means holding the member in adjusted position, an electrical circuit for heating the boiler including a manual switch, means including an electromagnet for releasing the locking means, and means for energizing the electromagnet including a second manual switch.

11. A steam-actuated motor as set forth in claim 10 including further means whereby closure of the second manual switch completes an electrical circuit for heating the boiler, and means whereby release of the locking means breaks said heating circuit.

JOHN W. DICKEY.

REFERENCES CITED

The following references are of record in the file of this patent:

UNITED STATES PATENTS

| Number | Name | Date |
|---|---|---|
| 386,557 | Roberts | July 24, 1888 |
| 1,186,402 | Irelan | June 6, 1916 |
| 1,487,946 | Johnson | Mar. 25, 1924 |
| 1,643,523 | Sauvage | Sept. 27, 1927 |
| 1,660,959 | Goodhue et al. | Feb. 28, 1928 |
| 1,721,584 | Andersen | July 23, 1929 |
| 1,779,514 | Smith et al. | Oct. 28, 1930 |
| 1,826,273 | Christiansen | Oct. 6, 1931 |
| 1,836,813 | Rankin | Dec. 15, 1931 |
| 1,881,964 | Persons | Oct. 11, 1932 |
| 2,241,620 | Shoeld | May 13, 1941 |
| 2,389,067 | Lieberman | Nov. 13, 1945 |
| 2,433,493 | Turner | Dec. 30, 1947 |